United States Patent
Fan

(10) Patent No.: US 11,959,646 B2
(45) Date of Patent: Apr. 16, 2024

(54) IGNITION DEVICE FOR BIOMASS PARTICLE FUEL BARBECUE GRILL AND HEATER

(71) Applicant: Xianjia Fan, Zhongshan (CN)

(72) Inventor: Xianjia Fan, Zhongshan (CN)

(73) Assignee: WH Products, LLC, Columbus, OH (US)

(*) Notice: Subject to any disclaimer, the term of this patent is extended or adjusted under 35 U.S.C. 154(b) by 345 days.

(21) Appl. No.: 17/280,935

(22) PCT Filed: Nov. 11, 2019

(86) PCT No.: PCT/CN2019/119806
§ 371 (c)(1),
(2) Date: Mar. 29, 2021

(87) PCT Pub. No.: WO2021/008050
PCT Pub. Date: Jan. 21, 2021

(65) Prior Publication Data
US 2022/0090793 A1    Mar. 24, 2022

(30) Foreign Application Priority Data
Jul. 17, 2019 (CN) .......................... 201921120518.3

(51) Int. Cl.
*F24C 3/10* (2006.01)
*F23Q 3/00* (2006.01)
(Continued)

(52) U.S. Cl.
CPC ................. *F24C 3/10* (2013.01); *F23Q 3/00* (2013.01); *F24B 13/04* (2013.01); *A47J 37/0704* (2013.01)

(58) Field of Classification Search
CPC .. F23Q 3/00; F23Q 3/002; F24C 3/103; F24C 3/10; F24B 13/04; A47J 37/0704; Y02A 40/928
See application file for complete search history.

(56) References Cited

U.S. PATENT DOCUMENTS

| 5,960,783 A | 10/1999 | Schubert et al. |
| 2015/0320259 A1* | 11/2015 | Tucker .................. F24B 13/04 126/10 |

(Continued)

FOREIGN PATENT DOCUMENTS

| CN | 202403292 U | 8/2012 |
| CN | 105455674 A | 4/2016 |

(Continued)

OTHER PUBLICATIONS

International Search Report dated Apr. 15, 2020, issued in application No. PCT/CN2019/119806.

*Primary Examiner* — Alfred Basichas
(74) *Attorney, Agent, or Firm* — David R Yohannan

(57) ABSTRACT

An ignition device for a biomass particle fuel barbecue grill and a heater, the device comprising an electrode rod (2), an igniter (3) and a wire (5), wherein the electrode rod (2) is arranged at the bottom part of a biomass particle fuel combustion area, (1) in a biomass particle barbecue grill body. Specifically, a hole site is arranged at the bottom part of the biomass particle fuel combustion area (1) for fixing and installing the electrode rod, (2) and making contact with biomass particles in the biomass particle fuel combustion area (1); the igniter (3) is fixedly arranged at a suitable position on the outer surface of the biomass particle barbecue grill body; and the igniter (3) is connected to the electrode rod (2) by means of the wire (5).

6 Claims, 1 Drawing Sheet

(51) Int. Cl.
*F24B 13/04* (2006.01)
*A47J 37/07* (2006.01)

(56) References Cited

U.S. PATENT DOCUMENTS

2016/0255999 A1* 9/2016 McAdams .......... A47J 37/0754
2017/0176018 A1* 6/2017 Traeger .................. F24B 13/04

FOREIGN PATENT DOCUMENTS

| CN | 205137553 U | 4/2016 |
| CN | 206131058 U | 4/2017 |
| CN | 208652690 U | 3/2019 |

* cited by examiner

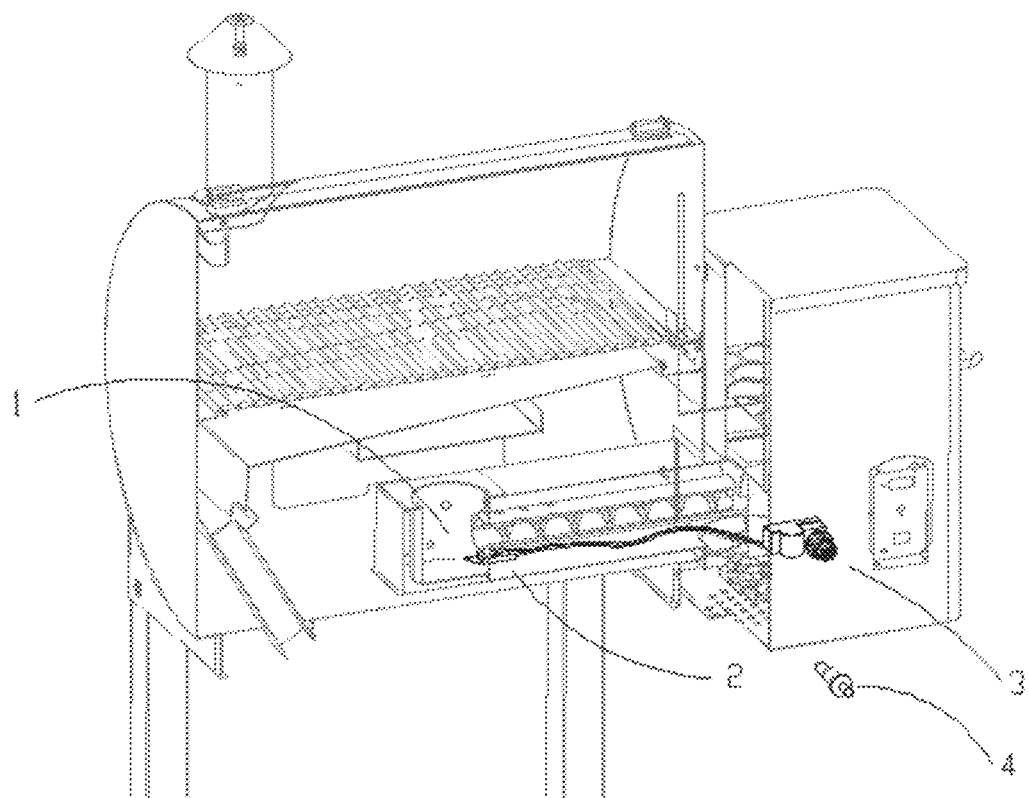

IGNITION DEVICE FOR BIOMASS PARTICLE FUEL BARBECUE GRILL AND HEATER

TECHNICAL FIELD

The present invention belongs to the field of barbecue grills, in particular to an ignition device for biomass particle fuel barbecue grill and heater.

BACKGROUND TECHNOLOGY

Ignition of existing biomass fuel barbecue grills commercially available is done by resistive heating bars, and ignition of heaters is done under similar principles, and in subsequent work thereof, constant temperature is maintained by circuit control panels to realize a desired usage effect.

However, the resistive heating bars are of high power during actual use, and a stable power supply is required to reach and maintain constant temperature after ignition. With gradually wide application of biomass particle fuel barbecue grills, requirements of ordinary people have upgraded and changed; specifically, what is in need is portability for outdoor use, which makes it possible to be used in camping areas or outdoor vacation places without power grid or power supply. Therefore, it is necessary to develop a device that can facilitate ignition of the barbecue grills in the open air.

SUMMARY OF INVENTION

In order to solve the above problems, the present invention provide an ignition device for biomass particle fuel barbecue grill and heater, comprising an electrode rod, an igniter and a wire, wherein the electrode rod is arranged at a bottom part of a biomass particle fuel combustion area in a biomass particle barbecue grill body, specifically, a hole site is arranged at the bottom part of the biomass particle fuel combustion area for fixing and installing the electrode rod and the electrode rod contacts biomass particles in the biomass particle fuel combustion area; the igniter is fixedly arranged at a suitable position on an outer surface of the biomass particle barbecue grill body; and the igniter is connected to the electrode rod by means of the wire.

Preferably, the igniter is a pulse igniter.

Preferably, the igniter could be replaced as a manual igniter and the manual igniter is a manual ceramic piezoelectric igniter.

Preferably, the biomass particle fuel combustion area is defined in an inner cavity and a combustion area of the biomass particle fuel barbecue grill for placing biomass particles, located under the grill.

Preferably, the biomass particle fuel combustion area is provided with vent holes, or provided with a screw feeder and an air blower as necessary.

Preferably, the wire connected to the electrode rod is laid at a bottom portion of the inner cavity of the biomass particle barbecue grill body.

Preferably, a conductor material for making the wire (5) could be a stranded silver jacketed wire or a nickel-coated copper wire, an insulating material thereof is Teflon, and a material that a protective cover of the wire is made from could be one of polyurethane, polyester and polyvinylidene fluoride.

Preferably, the igniter can generate a high-frequency voltage which is then transmitted by the wire so as to have the electrode rod generate arc sparks.

The present invention has following beneficial effects: according to the present invention, an electrode rod is provided in a biomass particle fuel combustion area, and a voltage-generating igniter and a high-temperature resistant wire for transmitting high-frequency voltage are installed to allow the electrode rod to generate arc sparks by means of a manual operation, so as to ignite the biomass particle fuel; the igniter is a pulse igniter and could be replaced with a manual ceramic piezoelectric igniter which could also generate a high-frequency voltage as necessary. By the above arrangement it is possible to replace original resistance wire heating bar biomass particle fuel barbecue grills, and to be released from "bondage" and realize portable and outdoor use of the biomass particle fuel barbecue grills in an environment with no standard commercial power supply (110V/120V or 220V/240V).

DESCRIPTION OF DRAWING

The present invention is further described in the following paragraphs in combination with the attached drawings and concrete embodiments FIG. 1 is a sectional view of the present invention.

SPECIFIC EMBODIMENTS

In order to make the technical solution, creation characteristics, goals and effects of the present invention easy to understand, the present invention is further described in combination with the specific embodiments.

With reference to FIG. 1, the present embodiment adopts following technical solutions: an ignition device for biomass particle fuel barbecue grill and heater comprises an electrode rod (2), an igniter (3) and a wire (5), wherein the electrode rod (2) is arranged at a bottom part of a biomass particle fuel combustion area (1) in a biomass particle barbecue grill body. Specifically, a hole site is arranged at the bottom part of the biomass particle fuel combustion area (1) for fixing and installing the electrode rod, (2) and the electrode rod contacts biomass particles in the biomass particle fuel combustion area (1); the igniter (3) is fixedly arranged at a suitable position on an outer surface of the biomass particle barbecue grill body; and the igniter (3) is connected to the electrode rod (2) by means of the wire (5).

Further, the igniter (3) is a pulse igniter.

Further, the igniter (3) could be replaced by a manual igniter (4) and the manual igniter (4) is a manual ceramic piezoelectric igniter.

Further, the biomass particle fuel combustion area (1) is defined in an inner cavity and a combustion area of the biomass particle fuel barbecue grill for placing the biomass particles, located under the grill.

Further, the biomass particle fuel combustion area (1) is provided with vent holes, or installed with a screw feeder and an air blower according to the actual needs.

Further, the wire (5) connected to the electrode rod (2) is laid at the bottom of the inner cavity of the biomass particle barbecue grill body Further, the conductor material of the wire (5) could be a stranded silver jacketed wire or nickel-coated copper wire, the insulating material thereof is Teflon, and a material that a protective cover of the wire is made from could be one of polyurethane, polyester and polyvinylidene fluoride.

Further, the igniter (3) is able to generate a high-frequency voltage which is then transmitted by the wire (5) so as to allow the electrode rod (2) to generate arc sparks.

The present embodiment takes the above technical solution as an example.

The present invention realizes the ignition of biomass particle fuel barbecue grill by using electrode rod to replace the resistance wire heating rod which is widely used at present. According to the present invention, a pulse igniter works together with the electrode rod, and a high-temperature resistant wire connects them, and the pulse igniter could be replaced with a manual ceramic piezoelectric igniter according to the needs so as to achieve ideal effect.

Specifically, the igniter generates a high-frequency voltage which is then transmitted by the wire so as to allow the electrode rod to generate arc sparks. In use, solid alcohol, wax, fuel oil and other media can be added to the biomass particle fuel to assist combustion, which can greatly improve efficiency of outdoor ignition.

In the present invention, an electrode rod is provided in a biomass particle fuel combustion area, and a voltage-generating igniter and a high-temperature resistant wire for transmitting high-frequency voltage are installed to allow the electrode rod to generate arc sparks by means of a manual operation, so as to ignite the biomass particle fuel. By the above arrangement it is possible to replace original resistance wire heating bar biomass particle fuel barbecue grills, and to be released from "bondage" and realize portable and outdoor use of the biomass particle fuel barbecue grills in an environment with no standard commercial power supply (110V/120V or 220V/240V).

The above shows and describes the basic principles and main features of the present invention and the advantages of the present invention. Those skilled in the art should understand that the present invention is not limited by the above-mentioned embodiments. What is described in the illustration of the above embodiment is only to explain principles of the present invention. Without departing from the spirit and scope of the present invention, there will be various changes and improvements in the present invention, and these changes and improvements fall within the scope of the claimed invention. The scope of protection claimed by the present invention is defined by the appended claims and their equivalents.

The invention claimed is:

1. An ignition device for biomass particle fuel barbecue grill and heater, comprising an electrode rod (2), an igniter (3) and a wire (5), wherein the electrode rod (2) is arranged at a bottom part of a biomass particle fuel combustion area (1) in a biomass particle barbecue grill body, specifically, a hole site is arranged at the bottom part of the biomass particle fuel combustion area (1) for fixing and installing the electrode rod (2) and the electrode rod contacts biomass particles in the biomass particle fuel combustion area (1); the igniter (3) is fixedly arranged at a position on an outer surface of the biomass particle barbecue grill body; the igniter (3) is connected to the electrode rod (2) by means of the wire (5); the wire (5) connected to the electrode rod (2) is laid at a bottom portion of the inner cavity of the biomass particle barbecue grill body and the igniter (3) can generate a high frequency voltage which is then transmitted by the wire (5) so as to have the electrode rod (2) generate arc sparks.

2. The ignition device for biomass particle fuel barbecue grill and heater according to claim 1, wherein the igniter (3) is a pulse igniter.

3. The ignition device for biomass particle fuel barbecue grill and heater according to claim 1, wherein the igniter (3) could be replaced with a manual igniter (4) and the manual igniter (4) is a manual ceramic piezoelectric igniter.

4. The ignition device for biomass particle fuel barbecue grill and heater according to claim 1, wherein the biomass particle fuel combustion area (1) is defined as an inner cavity and a combustion area of the biomass particle fuel barbecue grill for placing the biomass particles, located under a grill frame.

5. The ignition device for biomass particle fuel barbecue grill and heater according to claim 4, wherein the biomass particle fuel combustion area (1) is provided with vent holes, or provided with a screw feeder and an air blower as necessary.

6. The ignition device for biomass particle fuel barbecue grill and heater according to claim 1, wherein a conductor material of the wire (5) could be a stranded silver jacketed wire or a nickel-coated copper wire, an insulating material thereof is Teflon, and a material that a protective cover of the wire is made from could be one of polyurethane, polyester and polyvinylidene fluoride.

\* \* \* \* \*